US007009800B2

(12) United States Patent
Yang

(10) Patent No.: US 7,009,800 B2
(45) Date of Patent: Mar. 7, 2006

(54) METHOD TO CONTROL FLYING HEIGHT BETWEEN A HEAD AND A DISK AND APPARATUS THEREOF

(75) Inventor: Won-choul Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 10/664,887

(22) Filed: Sep. 22, 2003

(65) Prior Publication Data

US 2005/0013036 A1    Jan. 20, 2005

(30) Foreign Application Priority Data

Sep. 19, 2002 (KR) ...................... 10-2002-0057324

(51) Int. Cl.
*G11B 5/60*   (2006.01)
(52) U.S. Cl. .............................. 360/75; 360/46; 360/68
(58) Field of Classification Search .................... None
See application file for complete search history.

(56) References Cited

U.S. PATENT DOCUMENTS

| 6,064,534 | A  | * | 5/2000  | Simozato ................... 360/46 |
| 6,195,219 | B1 | * | 2/2001  | Smith ......................... 360/66 |
| 6,297,921 | B1 | * | 10/2001 | Price et al. ................. 360/68 |
| 2003/0002183 | A1 | * | 1/2003 | Fioravanti .................. 360/75 |
| 2004/0100255 | A1 | * | 5/2004 | Brunnett et al. ............ 324/210 |

* cited by examiner

*Primary Examiner*—David Hudspeth
*Assistant Examiner*—James L. Habermehl
(74) *Attorney, Agent, or Firm*—Staas & Halsey LLP

(57) ABSTRACT

A method and apparatus to control changes in a flying height between a write head and a disk caused by a write current or an overshoot value of a write current are provided. The method comprises: changing a write current or an overshoot value of the write current in relation to a temperature; determining whether the head and the disk surface of a hard disk drive are in contact in relation to changes of the write current or the overshoot value of the write current; and setting the write current and the overshoot value of the write current as a threshold when the head and disk surface are in contact. Accordingly, the magnitude of a write current and the threshold of an overshoot value can be accurately set, and a write current equal to or less than the threshold can be provided when a write operation is performed, thereby providing a reliable write operation.

17 Claims, 5 Drawing Sheets

METHOD TO CONTROL FLYING HEIGHT BETWEEN A HEAD AND A DISK AND APPARATUS THEREOF

CROSS-REFERENCE TO RELATED APPLICATIONS

This application claims the priority of Korean Patent Application No. 2002-57324 filed on Sep. 19, 2002 in the Korean Intellectual Property Office, the disclosure of which is incorporated herein in its entirety by reference.

BACKGROUND OF THE INVENTION

1. Field of the Invention

An aspect of the present invention relates to a hard disk drive, and more particularly, to a method and an apparatus to control changes in a flying height between a write head and a disk caused by a write current or an overshoot of a write current.

2. Description of the Related Art

Depicted in FIG. 1 is a protrusion of a write pole caused by magnetic fields generated between a head and a disk when a write current is provided. The bar on the right-hand side of FIG. 1 shows that the protrusion becomes more serious as the flying height between the head and the disk increases. Accordingly, in situations where the head flies and serious protrusion occurs, contact between the head and disk also takes place causing the interface between the head and a medium to be seriously affected.

Generally, a hard disk drive comprises at least one rotating disk or platter whose surface is coated with magnetizable material. Even when a flying height from the surface of each platter is maintained, if a write current is provided to a related read/write head, a pole tip forming the head exhibits characteristics of thermal expansion in accordance with Joule's heat by a normal state value and an overshoot value of a transient state of the write current. Consequently, due to thermal expansion, the protrusion of the write pole shown in FIG. 1 and contact between the head and disk occurs, reducing the reliability of the write operation.

SUMMARY OF THE INVENTION

Accordingly, an aspect of the present invention provides a method to control changes in a flying height between a write head and a disk by analyzing a vibration signal between the head and disk using an acoustic emission sensor, and a control apparatus thereof.

Another aspect of the present invention provides a computer readable medium having embodied thereon a computer program to perform the method.

According to yet another aspect of the present invention, there is provided a method to control changes in a flying height between a write head and a disk comprising: changing a write current or an overshoot value of the write current in relation to a temperature; determining whether the head and the disk surface of a hard disk drive are in contact according to the changed write current or the overshoot value of the write current; and setting the write current and the overshoot value of the write current as a threshold upon determining that the head and disk surface are in contact.

Additional aspects and advantages of the invention will be set forth in part in the description which follows and, in part, will be obvious from the description, or may be learned by practice of the invention.

According to another aspect of the present invention, there is provided an apparatus to control changes in a flying height between a write head and a disk comprising: a write current control unit to control the magnitude of a write current provided to the head of a hard disk drive in accordance with changes in temperature; an overshoot control unit to change an overshoot value of the write current at each magnitude of the write current; a signal analyzing unit to determine whether the head and the disk surface of the hard disk drive are in contact according to the changed write current and the overshoot value of the write value, which are controlled via the write current control unit and the overshoot control unit, respectively; and a threshold storing unit to store thresholds of the write current and the overshoot value analyzed in the signal analyzing unit.

BRIEF DESCRIPTION OF THE DRAWINGS

The above and/or other aspects and advantages of the invention will become apparent and more appreciated from the following description of the preferred embodiments, taken in conjunction with the accompanying drawings of which.

DETAILED DESCRIPTION OF THE PREFERRED EMBODIMENTS

Figure 1:
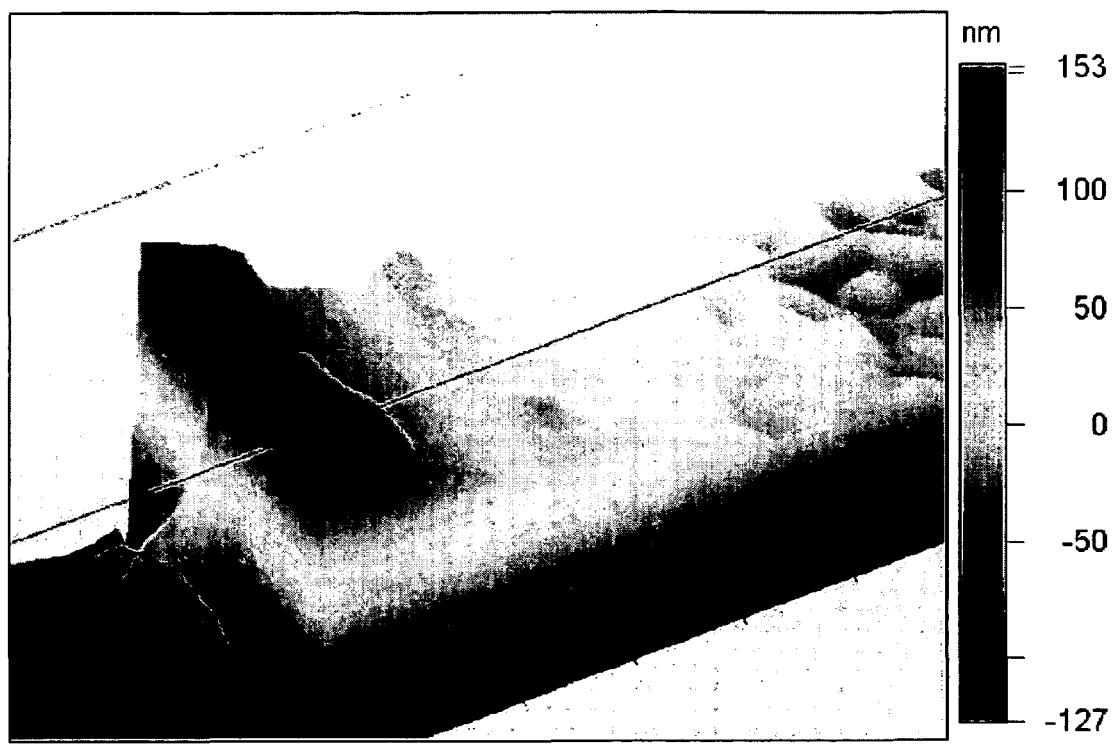
FIG. 1 depicts protrusion of a write pole caused by magnetic fields generated between a head and a disk when a write current is provided.

Reference will now be made in detail to the present preferred embodiments of the present invention, examples of which are illustrated in the accompanying drawings, wherein like reference numerals refer to the like elements throughout.

Figure 2:
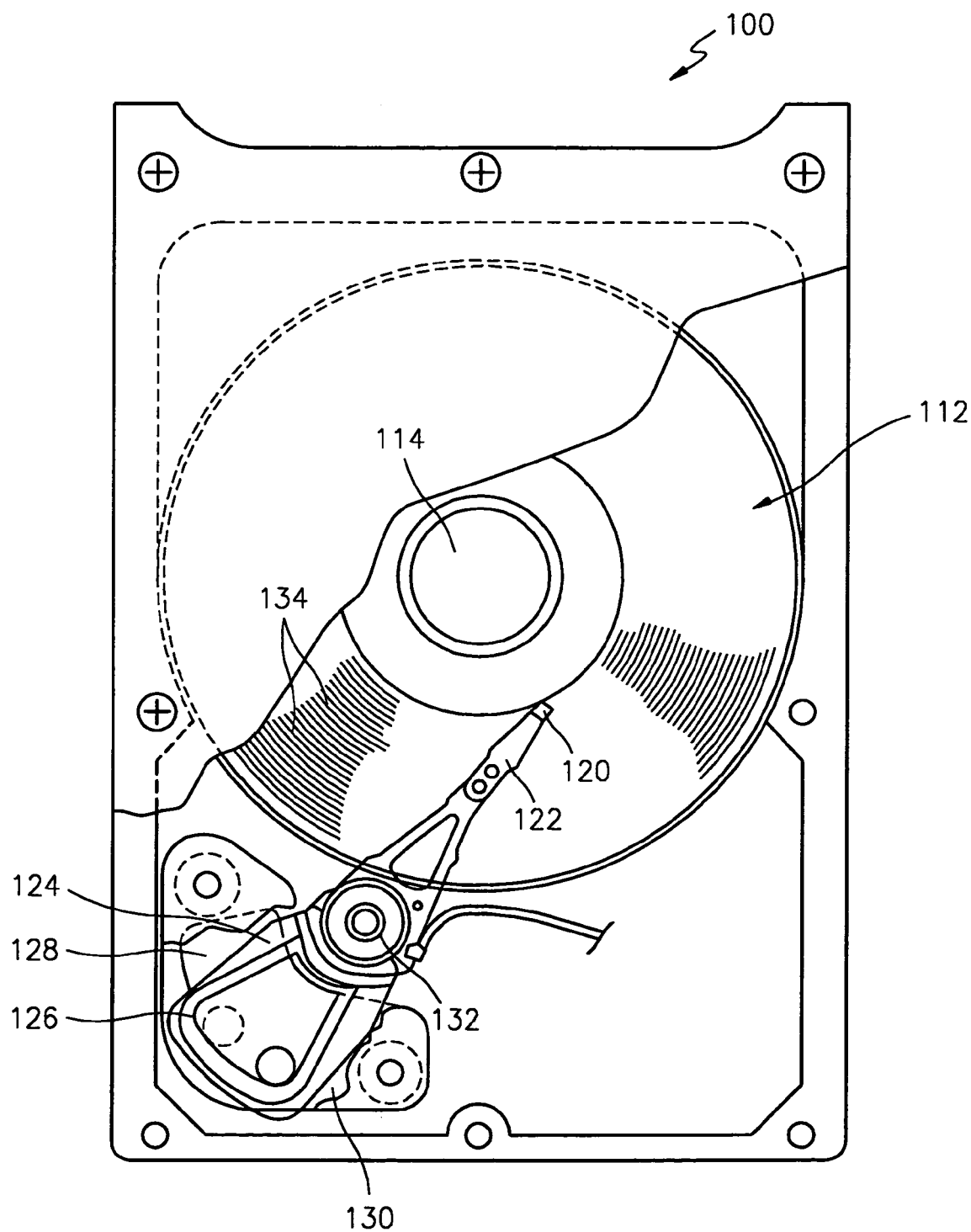
FIG. 2 is a diagram of a structure of a hard disk drive to which an aspect of the present invention is applied.

A diagram of an exemplary structure of a hard disk drive 100 to which an aspect of the present invention may be applied is shown in FIG. 2.

The hard disk drive 100 comprises at least one magnetic disk 112 rotated by a spindle motor 114. The hard disk drive 100 also comprises a converter (not shown) located close to the surface of the magnetic disk 112.

The converter senses the magnetic field of each magnetic disk 112 or magnetizes the magnetic disk 112 so that the converter can read information from or write information on the magnetic disk 112. Generally, the converter is coupled to the surface of each magnetic disk 112. Although the converter is explained as a single unit here, the converter should be understood as formed with a write converter to magnetize the magnetic disk 112, and a separate read converter to sense the magnetic field of the magnetic disk 112. The read converter is a magneto-resistive (MR) device, for example.

The converter may be integrated into a head 120. The head 120 has a structure, which generates air bearing between the converter and the surface of the disk 112. The head is coupled to a head stack assembly (HSA) 122. The head stack assembly is attached to an actuator arm 124 having a voice coil. The voice coil 126 is located close to a magnetic assembly 128 determining a voice coil motor (VCM) 130. A current provided to the voice coil 126 generates a torque rotating the actuator arm 124 about a bearing assembly 132. The rotation of the actuator arm 124 moves the converter across the surface of the disk 112.

Typically, information is stored in a circular track of the disk 112. Generally, each track 134 has a plurality of sectors. Each sector has a data sector containing a data field, and a servo sector containing an identification field. Between each data sector there is an inter sector gap (ISG) region. The identification field has a Gray code to identify sectors and tracks (cylinders). The converter moves across the surface of the disk 112 in order to read information from or write information on subsequent tracks.

Figure 3:
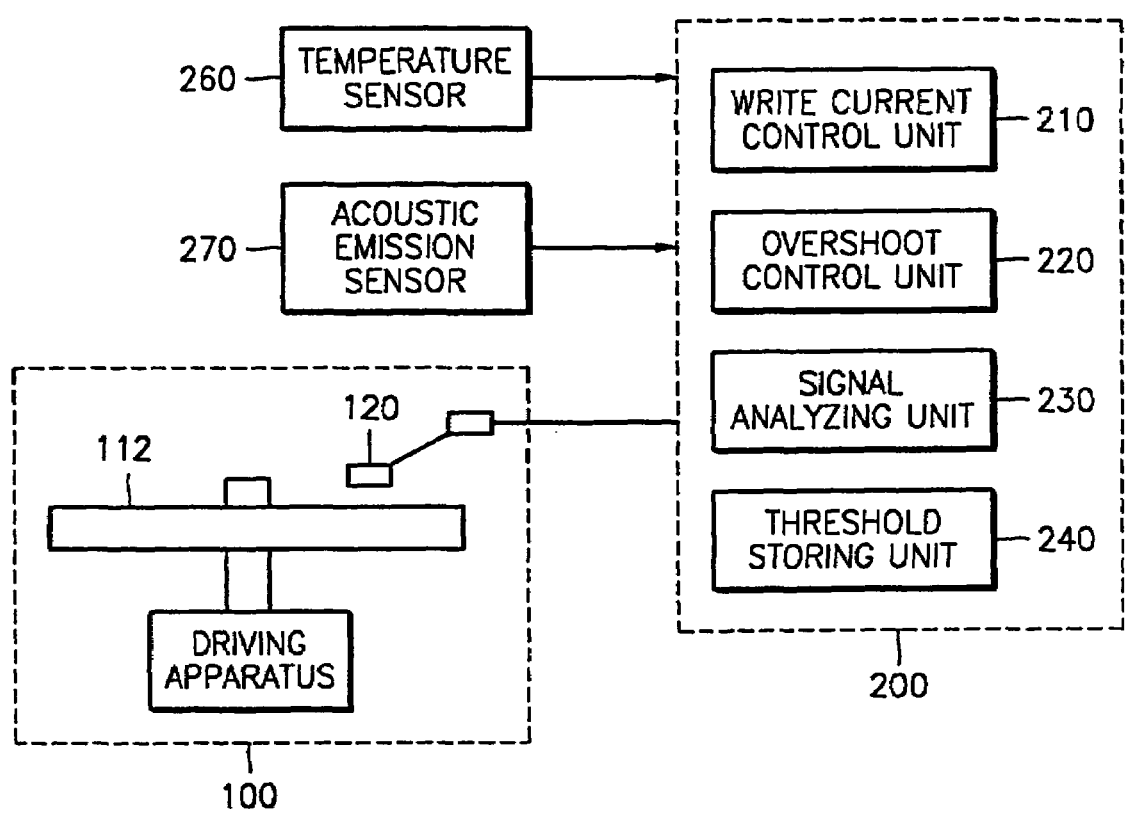
FIG. 3 is a block diagram of an apparatus to control changes in a flying height between a write head and a disk according to an aspect of the present invention.

An apparatus to control changes in a flying height between a write head and a disk in the hard disk drive 100 is shown in FIG. 3. Using an acoustic emission (AE) sensor 270, the apparatus to control changes in a flying height 200, detects and analyses a signal of frictional vibration between the disk 112 and head 120 of the hard disk drive 100. Subsequent to the detection and analysis, the magnitude of a write current and the overshoot value of the write current are set.

When a transformation energy generated locally in a substance (a material or a test slice) is suddenly dissolved, an elastic wave is generated. The elastic wave is referred to as an acoustic emission (AE) wave. Using the AE wave, the AE sensor 270 converts a mechanical signal that is a dynamic vibration signal inside the hard disk drive 100 into an electric signal.

A write current control unit 210 adjusts the magnitude of a write current, which is provided to the hard disk drive 100.

An overshoot control unit 220 controls an overshoot occurring during a transient response of a write current. For this, the overshoot control unit 220 can be implemented as a transient response damping circuit comprising a resistive load connected to the head and a capacitive load connected parallel to the resistive load.

A signal analyzing unit 230 receives a signal regarding contact between the disk 112 and the head 120, from the AE sensor 270 mounted on the pivot of the hard disk drive 100, and by analyzing the signal determines whether the disk 112 and the head 120 are in contact.

A threshold storing unit 240 stores the magnitude of the write current and the overshoot value analyzed by the signal analyzing unit 230 when the disk 112 and the head 120 are in contact, and also stores the temperature sensed by a temperature sensor 260.

Figure 4:
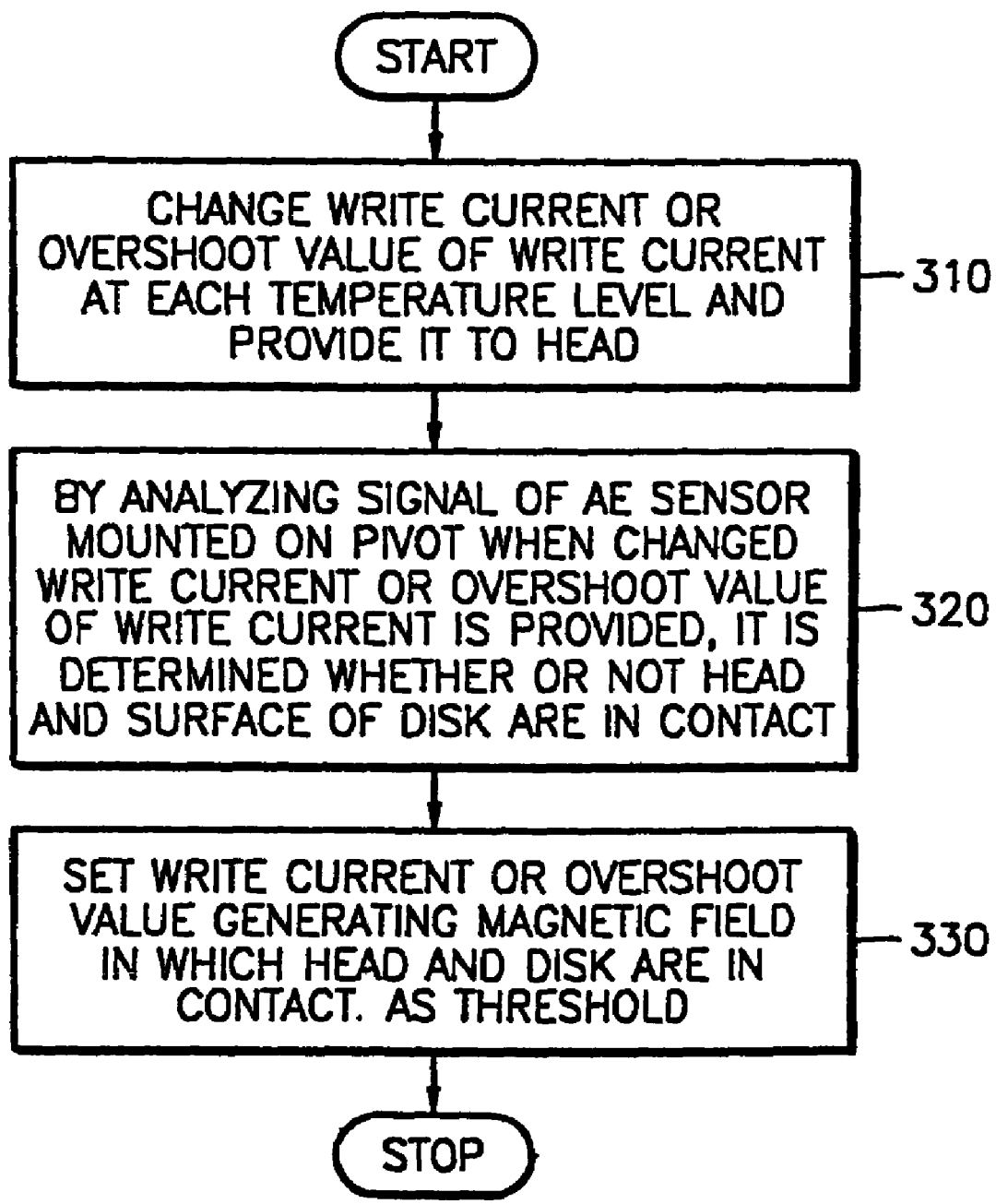
FIG. 4 is a flowchart to show a method to control changes in a flying height between a write head and a disk according to an aspect of the present invention.

A method to control changes in a flying height between a write head and a disk according to an aspect of the present invention is shown in FIG. 4.

The write current control unit 210 changes the magnitude of the write current in relation to the temperature; the overshoot control unit 220 changes the overshoot value in relation to each write current and provides the values to the head 120 in operation 310. If a write current is provided, a magnetic field is generated in the head 120 such that data is recorded on the disk 112. At this time, the AE sensor 270 mounted on the pivot of the hard disk sends a signal of sensed changes between the disk 112 and the head 120 to the signal analyzing unit 230, and in operation 320, the signal analyzing unit 230 analyzes this signal and determines whether the disk 112 and the head 120 are in contact. Upon determination that they are in contact, the provided write current and the overshoot value during the contact are set as thresholds in operation 330, and the thresholds are stored in the threshold storing unit 240.

In order to set the thresholds, a signal of the AE sensor 270 is detected with each changing magnitude of the write current in accordance with changes in temperature and it is also determined whether the disk 112 and the head 120 are in contact. If the write current is set, a signal of the AE sensor 270 is detected with each changing overshoot value of the write current, and it is determined whether the disk 112 and the head 120 are in contact. By repeating these processes, thresholds are set.

Figure 5:
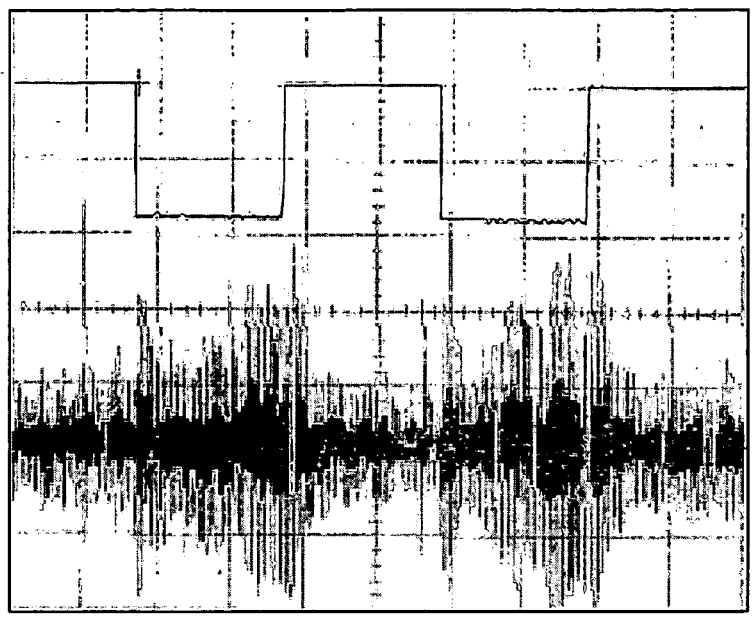
FIG. 5 is a graph depicting a signal in relation to changes to a head and a disk when the a write current is provided.

A graph depicting a signal in relation to changes to the head and the disk when the write current is provided in FIG. 5. The waveform on the top of FIG. 5 depicts the output waveform of a write gate, and the waveform at the bottom depicts the output waveform of the AE sensor 270.

If the head 120 and the disk 112 are in contact, the output waveform of the AE sensor 270 shown in FIG. 5 is generated, but if they are not in contact, the output waveform is not generated. Accordingly, with the use of the AE sensor 270, it can be determined whether the head 120 and the disk 112 are in contact.

Figure 6:
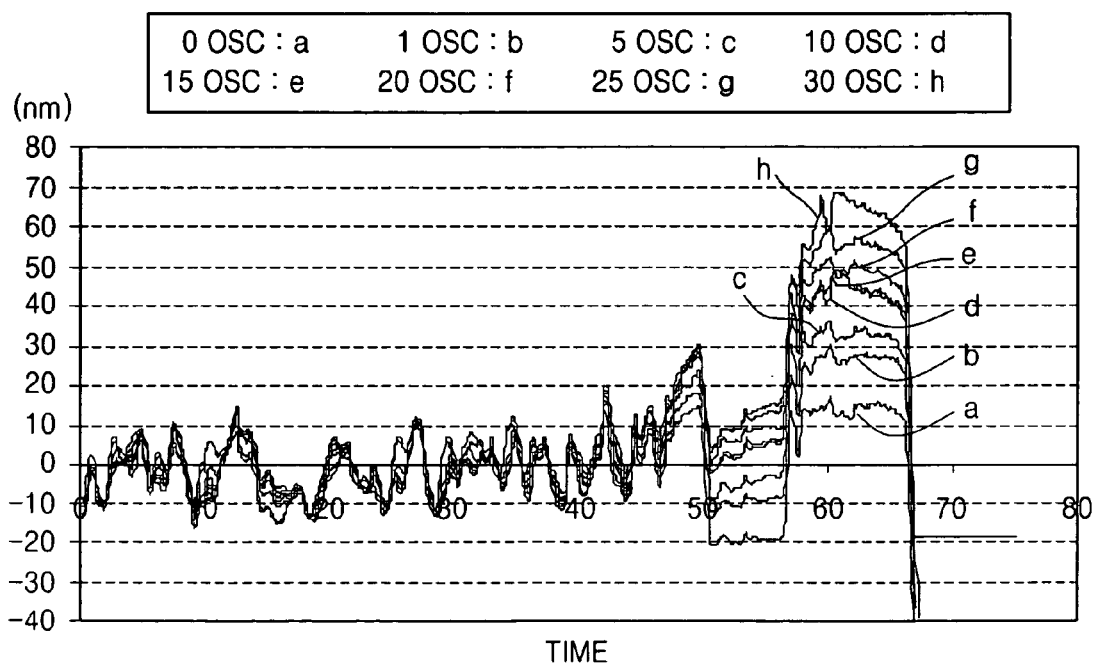
FIG. 6 is a graph depicting protrusion of a pole tip in relation to changes in an overshoot control of a write current.

A graph depicting a protrusion of a pole tip in relation to changes in the overshoot control of a write current is shown in FIG. 6. The graph of FIG. 6 shows the length of each protrusion of the pole tip in units of nanometer when the values of the overshoot control (OSC) are described as 0(a), 1(b), 5(c), 10(d), 15(e), 20(f), 25(g), and 30(h), respectively.

If the profile of the protrusion length of a pole tip is measured by changing the overshoot control value with the lapse of time, the protrusion length of the pole tip increases as the overshoot value increases. Accordingly, this shows that as the overshoot value increases, the contact between the head and the disk also increases.

As described above, according to the method to control changes in the flying height between a write head and a disk according to an aspect of the present invention, the threshold of the write current or the threshold of the overshoot value of the write current from which the head of the hard disk drive and the surface of the disk are in contact can be accurately set. Then, by controlling the write current and the overshoot value of the write current so that the current and the value do not exceed the threshold, contact between the head and the disk can be prevented.

The present invention may be embodied in a code, which can be read by a computer when placed on a computer readable recording medium. The computer readable recording medium includes a variety of recording apparatuses on which computer readable data are stored. For example, a storage media such as a magnetic storage media (e.g., ROM's, floppy disks, hard disks, etc.), optically readable media (e.g., CD-ROMs, DVDS, etc.) and carrier waves (e.g., transmissions over the Internet). In addition, the computer readable recording media can be distributed on computer systems connected through a network, which can store and execute a computer readable code in a distributed mode.

As described above, as the capacity of a hard disk drive and writing frequency increases, due to the high frequency, a large amount of heat is generated in the write coil of a head causing a protrusion of the pole tip of the magnetic head, and causing contact between the head and the disk. According to an aspect of the present invention, if the magnitude of the write current and the overshoot value at this time are set as thresholds, the contact between the head and the disk during the operation of the drive can be prevented and reliability of the drive is improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method to control changes in a flying height between a write head and a disk surface of a hard disk drive, comprising:
    changing a write current or an overshoot value of the write current in relation to a temperature;
    determining whether the write head and the disk surface of the hard disk drive are in contact in relation to the changed write current or the changed overshoot value of the write current; and
    setting the write current and the overshoot value of the write current as a threshold upon determining that the head and disk surface are in contact.

2. The method according to claim 1, wherein when changing the write current or the overshoot value of the write current, the magnitude of the write current is changed in accordance with changes in temperature and the overshoot value is changed at each magnitude of the write current.

3. The method according to claim 1, wherein determination of whether the write head and the disk surface of the hard disk are in contact is performed via analysis of a signal sensed by an acoustic emission sensor mounted on the pivot side of the hard disk.

4. The method according to claim 1, wherein the threshold of the write current and the overshoot value of the write current are stored.

5. An apparatus to control changes in a flying height between a write head and a disk surface of a hard disk drive, comprising:
    a write current control unit to control the magnitude of a write current provided to the head of the hard disk drive in accordance with changes in temperature;
    an overshoot control unit to change an overshoot value of the write current at each magnitude of the write current;
    a signal analyzing unit to determine whether the head and the disk surface of the hard disk drive are in contact in relation to the changes of the write current controlled via the write current control unit, and changes of the overshoot value of the write current controlled via the overshoot control unit; and
    a threshold storing unit to store thresholds of the write current and the overshoot value analyzed via the signal analyzing unit.

6. The apparatus according to claim 5, further comprising:
    an acoustic emission sensor mounted on a pivot of the hard disk drive to sense a vibration signal generated due to contact between the head and the disk surface as a result of a magnetic field generated when the write current is provided to the head.

7. The apparatus according to claim 5, further comprising:
    an acoustic emission sensor to sense a signal of frictional vibration between the disk and the head.

8. The apparatus according to claim 7, wherein the acoustic emission sensor converts a mechanical signal inside the hard disk into an electric signal.

9. The apparatus according to claim 5, wherein the overshoot control unit controls an overshoot occurring during a transient response of the write current.

10. The apparatus according to claim 5, wherein the signal analyzing unit receives a signal in relation to contact between the disk and the head via the acoustic emission sensor mounted on the pivot of the hard disk drive.

11. The apparatus according to claim 5, further comprising:
    a temperature sensor to sense temperature.

12. The apparatus according to claim 11, wherein the threshold storing unit stores the temperature sensed via the temperature sensor.

13. A computer readable medium having embodied thereon a computer program to perform a method, comprising:
    changing a write current or an overshoot value of the write current in relation to a temperature;
    determining whether a head and a disk surface of a hard disk drive are in contact in relation to changes of the write current or the overshoot value of the write current; and
    setting the write current and the overshoot value of the write current as a threshold upon determining that the head and disk surface are in contact.

14. A method to control changes of a flying height between a write head and a disk, comprising:
    detecting and analyzing a signal of frictional vibration between the disk and the head of the hard disk drive; and
    setting a magnitude of the write current and the overshoot value of the write current upon detecting and analyzing the signal of frictional vibration.

15. A method to control changes in a flying height between a write head and a disk, comprising:
    changing a magnitude of a write current in relation to a temperature;
    changing an overshoot value in relation to each magnitude change of the write current;
    sensing changes of the head and the disk;
    analyzing the changes of the head and the disk to determine whether the disk and the head are in contact; and
    setting the write current and the overshoot value of the write current as threshold upon determining that the disk and the head are in contact.

16. The method according to claim 15, wherein the acoustic emission sensor senses each changing magnitude of the write current at each temperature variation.

17. An apparatus to control changes of a flying height between a write head and a disk, comprising:
    an acoustic emission sensor to detect and analyze a signal of frictional vibration between the disk and the head of the hard disk drive; and
    a threshold unit to set and store magnitude of the write current and the overshoot value of the write current upon detecting and analyzing the signal of frictional vibration.

* * * * *